United States Patent [19]

Okamoto et al.

[11] Patent Number: 5,523,683

[45] Date of Patent: Jun. 4, 1996

[54] INDUCTION SENSOR RESPONSIVE TO A DISPLACEMENT OF A MOVABLE BODY

[75] Inventors: Terumitsu Okamoto; Takeshi Ikemoto, both of Tokyo, Japan

[73] Assignee: NEC Corporation, Tokyo, Japan

[21] Appl. No.: 360,113

[22] Filed: Dec. 20, 1994

[30]     Foreign Application Priority Data

Dec. 27, 1993 [JP] Japan .................................. 5-330708

[51] Int. Cl.⁶ ............................... G01B 7/14; G01B 7/30
[52] U.S. Cl. ................................ 324/207.17; 324/207.24
[58] Field of Search .......................... 324/207.12, 207.17, 324/207.22, 207.24; 336/45, 123, 128, 180

[56]              References Cited

U.S. PATENT DOCUMENTS 4,223,300  9/1980  Wiklund .............................. 324/207.17
4,893,077  11/1990  Auchterlonie ....................... 324/207.17

FOREIGN PATENT DOCUMENTS 2-275314  11/1990  Japan .
5-135236  6/1993  Japan .

*Primary Examiner*—Walter E. Snow
*Attorney, Agent, or Firm*—Young & Thompson

[57]              ABSTRACT

In an induction sensor for sensing the displacement of a movable body by electromagnetic induction, a scaler and a slider are each implemented as a hollow cylinder consisting of a plurality of conductors in the form of a coil. The conductors of each of the scaler and slider alternate with each other in a displacement sensing direction. The sensor can be assembled with a minimum of fine adjustment, eliminates wasteful areas, and provides the slider with high sensing accuracy without increasing currents to flow through the scaler.

5 Claims, 5 Drawing Sheets

INDUCTION SENSOR RESPONSIVE TO A DISPLACEMENT OF A MOVABLE BODY

BACKGROUND OF THE INVENTION

1. Field of the Invention

The present invention relates to an induction sensor for sensing the displacement of a movable body by electromagnetic induction.

2. Description of the Related Art

An induction sensor has customarily been used to sense, based on electromagnetic induction, the displacement of a body movable in a reciprocating motion in a predetermined direction, e.g., a printing mechanism included in a printer. The induction sensor is made up of a slider and a scaler each having flat coils printed on one surface thereof. The scaler, or slider body, is affixed to a printer or similar apparatus while the slider is mounted on a printing mechanism or similar movable body. It is a common practice to implement both the scaler and the slider with coil patterns printed on respective circuit boards. The substrate for the scaler usually has two coil patterns thereon which alternate with each other in the direction in which a displacement should be sensed. Sinusoidal currents different in phase by 90 degrees are respectively fed to the two coil patterns. The resulting magnetic field is sensed by the slider as sinusoidal waves whose phase change in accordance with a displacement.

Japanese Patent Laid-Open Publication No. 2-275314 discloses an induction sensor including a scaler which has two coil patterns printed on a substrate and each having two or more round-trip passes in order to reduce the ratio of the wasteful areas to the entire area of the substrate. This successfully enhances the dense arrangement of coil patterns in the displacement sensing direction and thereby increases the sensing accuracy. Japanese Patent Laid-Open Publication No. 5-135236 teaches an induction sensor including a scaler which has two coil patterns printed on a substrate and each having extra portions. The extra portions provide the coil patterns with the same length and, therefore, the same impedance, thereby promoting accurate sensing.

The conventional induction sensors described above have a problem that when the slider and scaler, i.e., substrates thereof are to be mounted to the respective positions, there must be finely adjusted the gap length, azimuth angle and so forth of the slider and scaler. Another problem is that when coil patterns are printed on a substrate, wasteful regions between the patterns cannot be eliminated. In addition, when the magnetic field to be generated by the scaler is intensified to enhance the sensing accuracy of the slider, it is necessary to increase the sinusoidal currents to be fed to the coil patterns of the scaler.

SUMMARY OF THE INVENTION

It is, therefore, an object of the present invention to provide an induction sensor which can be assembled with a minimum of fine adjustment.

It is another object of the present invention to provide an induction sensor which is free from wasteful areas and intensifies the electric field of a scaler for thereby increasing the sensing accuracy of a slider.

An induction sensor for sensing the displacement of a movable body by electromagnetic induction of the present invention has a hollow cylindrical scaler made up of a plurality of conductors in the form of a coil, and a hollow cylindrical slider made up of a plurality of conductors in the form of a coil. The conductors of each of the scaler and slider alternate with each other in the direction in which a displacement is to be sensed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
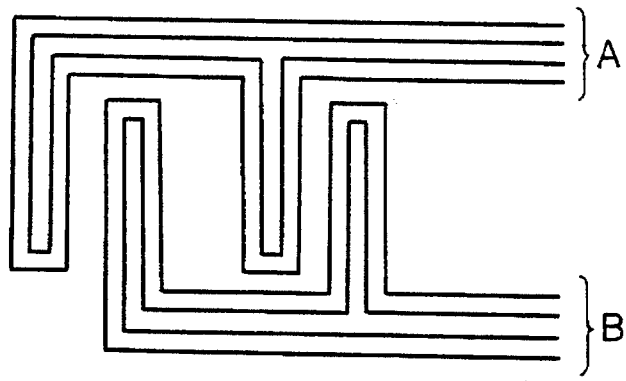
FIG. 1 shows a scaler included in a conventional induction sensor.

Generally, an induction sensor, or displacement sensor, senses a displacement by electromagnetic induction and is made up of a slider and a scaler. The slider follows the movement of a movable body while the scaler is affixed to the body of an apparatus including the movable body. It has been customary to implement both the scaler and the slider with coil patterns printed on respective circuit boards. As shown in FIG. 1, the substrate for the scaler usually has two coil patterns A and B thereon which alternate with each other in the direction in which a displacement should be sensed. Sinusoidal currents different in phase by 90 degrees are respectively fed to the coil patterns A and B. The resulting magnetic field is sensed by the slider as sinusoidal waves whose phase change in accordance with a displacement.

Figure 2A:
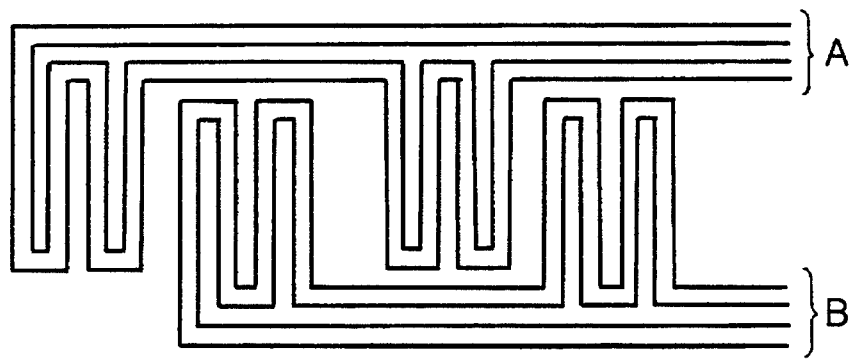
FIGS. 2A and 2B each shows a particular scaler configuration of another conventional induction sensor.
Figure 2B:
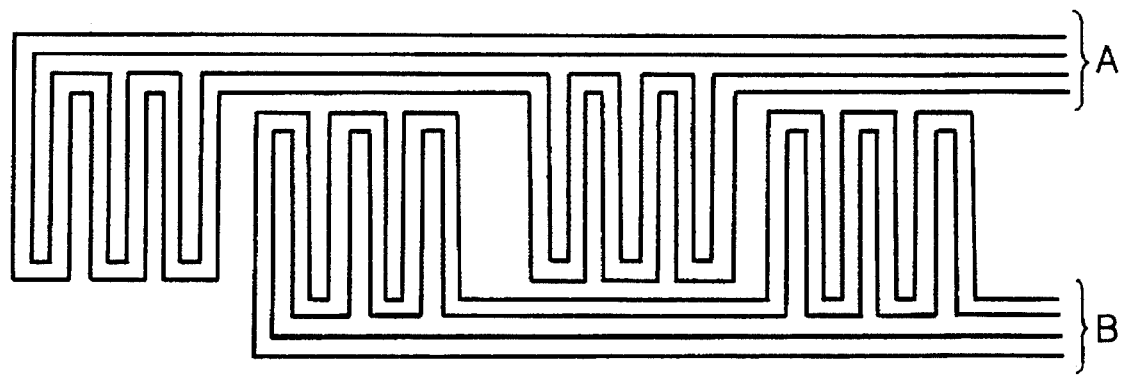
Figure 3A:
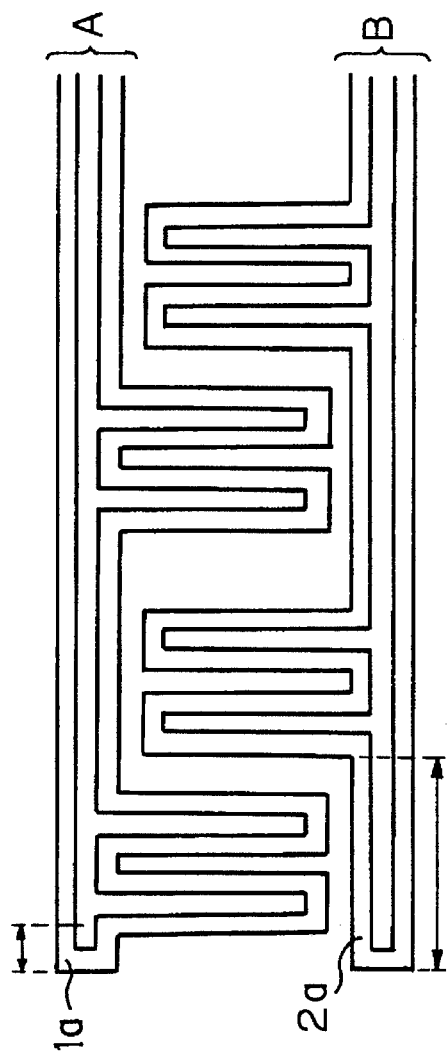
FIGS. 3A and 3B each shows a particular slider configuration of a conventional induction sensor.
Figure 3B:
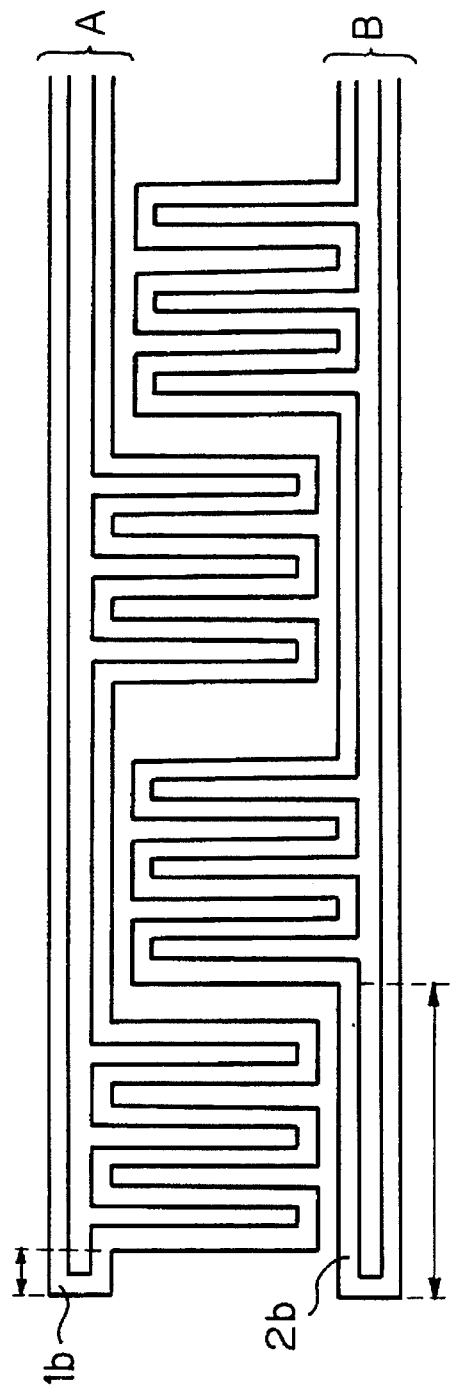

FIGS. 2A and 2B show a scaler included in an induction sensor taught in Japanese Patent Laid-Open Publication No. 2-275314 mentioned earlier. As shown, two coil patterns A and B printed on a substrate each has two or more round-trip passes in order to reduce the ratio of the wasteful areas to the entire area of the substrate. This successfully enhances the dense arrangement of coil patterns in the displacement sensing direction and thereby increases the sensing accuracy. FIGS. 3A and 3B show a scaler included in an induction sensor disclosed in Japanese Patent Laid-Open Publication No. 5-135236 also mentioned earlier. As shown, two coil patterns A and B printed on a substrate have extra portions 1a and 2a (FIG. 3A) or 1b and 2b (FIG. 3B), respectively. These extra portions provide the coil patterns A and B with the same length and, therefore, the same impedance, thereby promoting accurate sensing.

The conventional induction sensors described above have some issues yet to be solved, as follows. When the slider and scaler, i.e., their substrates, are to be fixed in the respective positions, there must be finely adjusted the gap length, azimuth angle and so forth of the slider and scaler. Further, when coil patterns are printed on a substrate, wasteful regions between the patterns cannot be eliminated. In addition, when the magnetic field to be generated by the scaler is intensified to enhance the sensing accuracy of the slider, it is necessary to increase the sinusoidal currents to be fed to the coil patterns of the scaler.

Figure 4A:
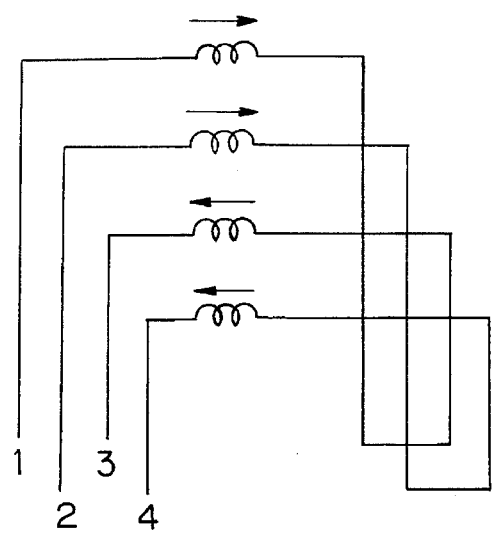
FIG. 4A is a circuit diagram representing a scaler included in an induction sensor embodying the present invention.
Figure 4B:
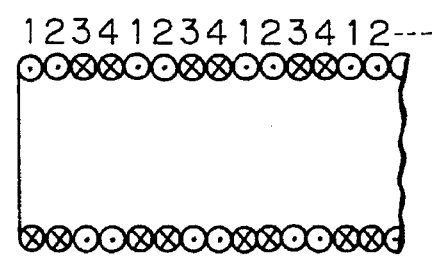
FIG. 4B is a section of the scaler shown in FIG. 4A.

An induction sensor embodying the present invention and free from the above-discussed problems will be described hereinafter. FIG. 4A shows circuitry representing a scaler in accordance with the present invention, while FIG. 4B shows the scaler in a section. As shown, the scaler has four conductors 1–4 turned in a hollow cylindrical configuration. As shown in FIG. 4A, the conductors 1 and 3 are connected together at their one end while the conductors 2 and 4 are connected together at their one end. Sinusoidal currents different in phase by 90 degrees are respectively fed from the conductor 2 to the conductor 3 and from the conductor 2 to the conductor 4. As a result, the sinusoidal currents flow through the conductors 1–4 in the manner illustrated in FIG. 4B. The sinusoidal current flowing through one conductor is different in phase from the current flowing though the adjoining conductor by 90 degrees without exception.

Figure 5A:
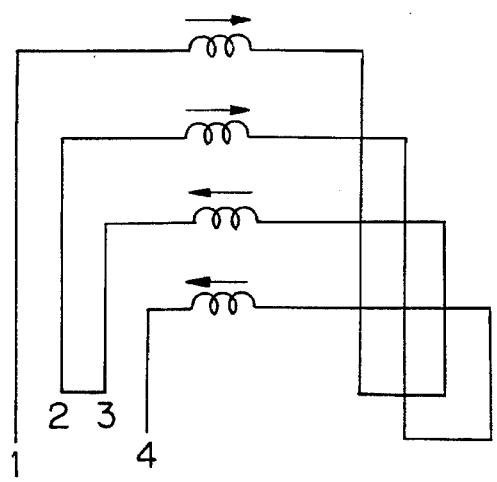
FIG. 5A is a circuit diagram representing a slider also included in the embodiment.
Figure 5B:
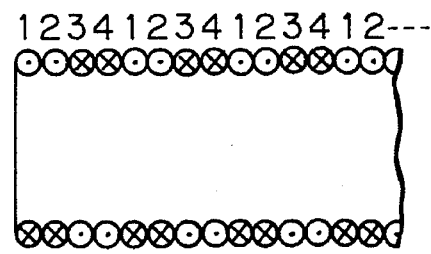
FIG. 5B is a section of the slider shown in FIG. 5A.

A slider cooperative with the scaler shown in FIGS. 4A and 4B is shown in FIG. 5A in a circuit diagram and in FIG. 5B in a section. As shown in FIG. 5A, the slider has conductors 1 and 3 connected together at one end thereof and conductors 2 and 4 connected together at one end thereof. The conductors 2 and 3 are connected to each other at the other end thereof. As a result, the slider senses sinusoidal waves flowing through the conductors 1–4 thereof, as shown in FIG. 5B. Such a flow of the currents through the slider is identical with the flow of currents through the scaler shown in FIG. 4B.

Figure 6:
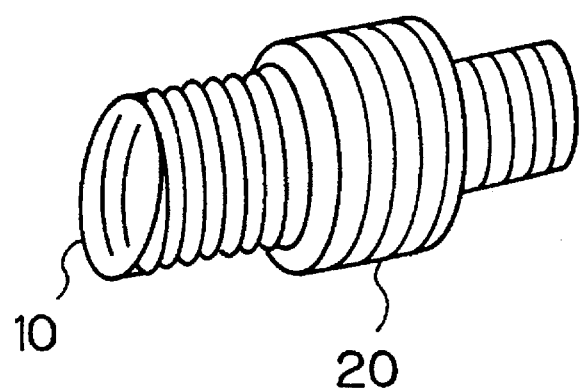
FIG. 6 is a perspective view of the embodiment.

FIG. 6 shows a scaler 10 and a slider 20 implemented by the configurations shown in FIGS. 4A and 4B and FIGS. 5A and 5B, respectively. As shown, the slider 20 has a greater diameter and a smaller length than the scaler 10 and coupled over the scaler 10 concentrically. In this condition, the slider 20 senses sinusoidal waves whose phases change in accordance with a displacement.

Figure 7:
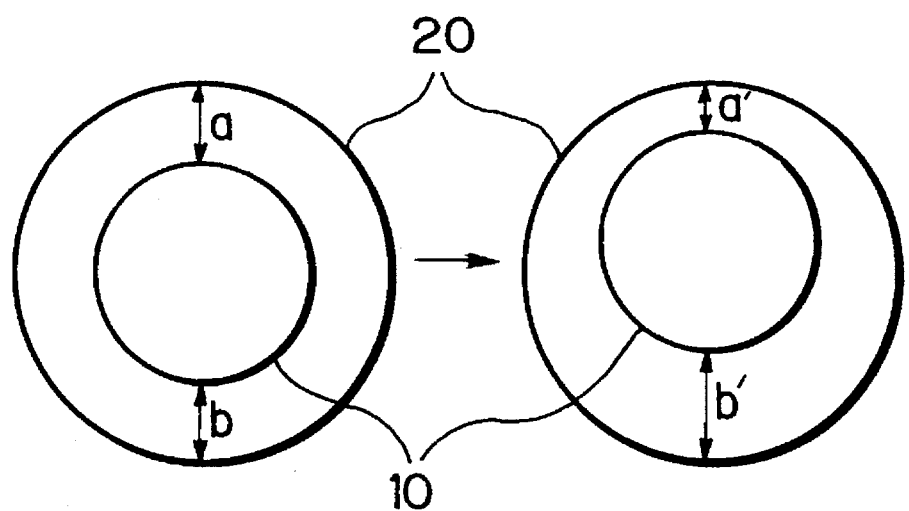
FIG. 7 is a section showing the scaler and slider of the embodiment in a non-concentric condition.

The scaler 10 and slider 20 should only be configured concentrically with each other and do not need any delicate adjustment. The gap length is one-half of the difference in diameter between the scaler 10 and the slider 20. Even if the scaler 10 and slider 20 are not concentric, the sensing accuracy achievable therewith is not effected. This is because, as shown in FIG. 7, a gap a at one side decreases to a' although a gap b at the other side increases to b'.

Figure 8:
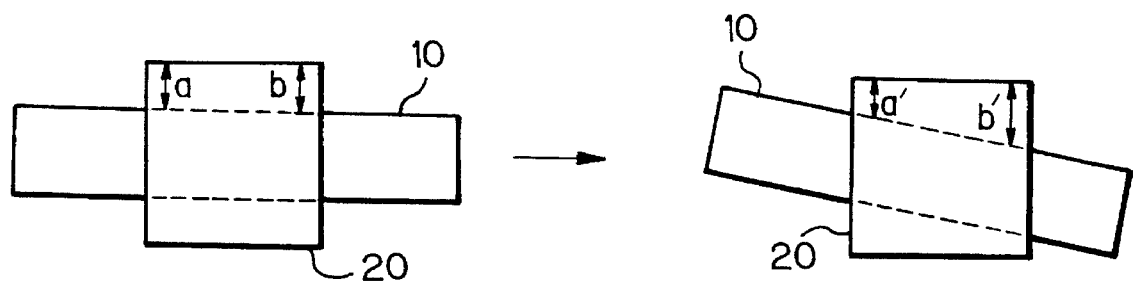
FIG. 8 is a section showing the scaler of the embodiment inclined relative to the slider.

Assume that the scaler 10 is inclined relative to the slider 20, as shown in FIG. 8. Even such a condition, like the non-concentric condition shown in FIG. 7, does not influence the sensing accuracy since a gap a at one end decreases to a' although a gap b at the other end increases to b'. As for an azimuth angle, even if it occurs at a certain side, it does not occur in a plane perpendicular to that side. Specifically, in the condition shown in FIG. 8, although an azimuth angle is deviated at the side, it is not deviated when the sensor is seen from the above.

Figure 9A:
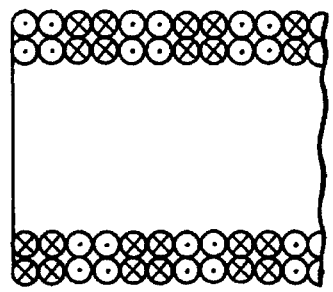
FIG. 9A is a section showing the slider of the embodiment implemented as a stack of conductors having a circular cross-section.
Figure 9B:
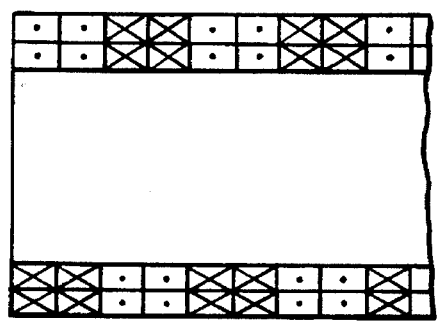
FIG. 9B is a view similar to FIG. 9A, showing the slider implemented by conductors having a rectangular cross-section.

FIGS. 9A and 9B each shows a particular implementation for intensifying the electric field of the scaler 10 without increasing the currents. As shown, a plurality of layers each consisting of a plurality of conductors in the form of a coil are stacked in the direction perpendicular to the displacement sensing direction. This successfully intensifies a magnetic flux, i.e., magnetic field without increasing the currents. When the conductors have a circular cross-section, as shown in FIG. 9A, gaps exist between the conductors and may prevent them from being stacked in the above-mentioned direction. In contrast, when the conductors have a rectangular cross-section, as shown in FIG. 9B, they can be satisfactorily stacked in the desired direction without any gaps.

Moreover, since the coils each has a hollow cylindrical configuration, the slider 20 may be rotated about the axis of the scaler 10 in order to delicately change the sensing accuracy of the slider 20, as desired.

In summary, it will be seen that the present invention provides an induction sensor which eliminates wasteful areas and intensifies the magnetic field of a scaler, implemented by a plurality of conductors in the form of two integral coils, without increasing sinusoidal currents to flow through the conductors, thereby increasing the sensing accuracy of the slider.

Various modifications will become possible for those skilled in the art after receiving the teachings of the present disclosure without departing from the scope thereof.

What is claimed is:

1. An induction sensor for sensing a displacement of a movable body by electromagnetic induction, comprising:
    a hollow cylindrical scaler comprising a first, second, third and fourth scaler conductors wound in a form of a coil, said first and third scaler conductors being connected together, and said second and fourth connectors being connected together; and
    a hollow cylindrical slider comprising a first, second, third and fourth slider conductors wound in a form of a coil, one end of each of said first and third slider conductors being connected together, one end of each of said second and fourth slider conductors being connected together, and another end of each of said second and third slider conductors being connected together;
    said conductors of each of said scaler and slider alternating with each other in a direction in which a displacement is to be sensed.

2. An induction sensor as claimed in claim 1, wherein all of said plurality of coils constitute coils of said induction sensor.

3. An induction sensor as claimed in claim 1, wherein said plurality of conductors are stacked in a direction perpendicular to the direction which a displacement is to be sensed.

4. An induction sensor as claimed in claim 1, wherein each of said plurality of conductors has a rectangular cross-section.

5. An induction sensor as claimed in claim 1, wherein said induction sensor is finely adjusted by having said slider rotated about an axis of said scaler.

* * * * *